(12) United States Patent
Kim et al.

(10) Patent No.: US 10,633,167 B2
(45) Date of Patent: Apr. 28, 2020

(54) SAFETY VALVE OF GAS CONTAINER

(71) Applicant: OJC CO., LTD., Seoul (KR)

(72) Inventors: Byoung Cheol Kim, Seoul (KR); Se Kyung Won, Incheon (KR); Min Cheol Kim, Bucheon-si (KR); Min Gyu Kang, Ansan-si (KR)

(73) Assignee: OJC CO., LTD., Seoul (KR)

( * ) Notice: Subject to any disclaimer, the term of this patent is extended or adjusted under 35 U.S.C. 154(b) by 0 days.

(21) Appl. No.: 16/089,022

(22) PCT Filed: Jun. 30, 2016

(86) PCT No.: PCT/KR2016/007059
§ 371 (c)(1),
(2) Date: Sep. 27, 2018

(87) PCT Pub. No.: WO2017/171144
PCT Pub. Date: Oct. 5, 2017

(65) Prior Publication Data
US 2019/0127142 A1    May 2, 2019

(30) Foreign Application Priority Data
Mar. 28, 2016  (KR) .......................... 10-2016-0036763

(51) Int. Cl.
*B65D 83/14*    (2006.01)
*B65D 83/48*    (2006.01)
(Continued)

(52) U.S. Cl.
CPC ................ *B65D 83/48* (2013.01); *B05B 1/00* (2013.01); *B65D 83/70* (2013.01); *F16K 3/265* (2013.01);
(Continued)

(58) Field of Classification Search
CPC ........ B65D 83/48; B65D 83/70; B65D 83/14; B65D 83/20; B65D 83/34; B65D 83/38;
(Continued)

(56) References Cited

U.S. PATENT DOCUMENTS 3,357,601 A * 12/1967 Crawford ............... B65D 83/14
222/397
3,791,561 A *  2/1974 Ewald .................... B65D 83/20
220/293
(Continued)

FOREIGN PATENT DOCUMENTS

JP      2013-082500 A    5/2013
KR    2005-0092527 A    9/2005
(Continued)

OTHER PUBLICATIONS

International Search Report issued in PCT/KR2016/007059 dated Dec. 1, 2016 (2 pages).
(Continued)

*Primary Examiner* — Charles Cheyney
(74) *Attorney, Agent, or Firm* — Osha Liang LLP

(57) ABSTRACT

Disclosed herein is an invention related to a gas cylinder safety valve. The disclosed gas cylinder safety valve includes a valve part configured to discharge gas with which a main body is filled and a gas blocking part disposed in the valve part and configured to block a gas flow path in accordance with a pressure inside the main body, wherein the gas blocking part includes a blocking operation part disposed in the valve part, a blocking pin member disposed to be slidable in the blocking operation part and configured to selectively block the gas flow path, and a separation preventing cap coupled to the blocking operation part and configured to prevent separation of the blocking pin member.

14 Claims, 4 Drawing Sheets

(51) Int. Cl.
*F17C 13/04* (2006.01)
*B05B 1/00* (2006.01)
*B65D 83/70* (2006.01)
*F16K 3/26* (2006.01)

(52) U.S. Cl.
CPC ...... *F17C 13/04* (2013.01); *F17C 2201/0109* (2013.01); *F17C 2201/0119* (2013.01); *F17C 2203/0617* (2013.01); *F17C 2205/0332* (2013.01); *F17C 2205/0335* (2013.01); *F17C 2205/0382* (2013.01); *F17C 2209/234* (2013.01); *F17C 2221/035* (2013.01); *F17C 2223/0153* (2013.01); *F17C 2223/035* (2013.01); *F17C 2270/0709* (2013.01)

(58) Field of Classification Search
CPC . B65D 83/62; F16K 1/30; F16K 3/265; F16K 17/04; F17C 13/04; F17C 2205/0332; F17C 2205/0335; F17C 2205/0382; F17C 2201/0109; F17C 2201/0119
USPC .................................. 222/396, 397, 402.24
See application file for complete search history.

(56) References Cited

U.S. PATENT DOCUMENTS

| | | | | |
|---|---|---|---|---|
| 3,870,203 A | * | 3/1975 | Frankenberg | B65D 83/48 222/397 |
| 3,951,314 A | * | 4/1976 | Toro | B65D 83/34 222/402.17 |
| 4,030,644 A | * | 6/1977 | Creighton | B65D 83/48 222/396 |
| 4,854,343 A | * | 8/1989 | Rilett | A62C 13/76 137/543.19 |
| 5,836,483 A | * | 11/1998 | Disel | B08B 9/0325 222/396 |
| 7,793,686 B2 | * | 9/2010 | Lee | F17C 13/04 137/588 |
| 2003/0071078 A1 | | 4/2003 | Park | |
| 2015/0192251 A1 | | 7/2015 | Tupper et al. | |
| 2019/0120394 A1 | | 4/2019 | Won et al. | |

FOREIGN PATENT DOCUMENTS

| | | |
|---|---|---|
| KR | 10-2013-0032719 A | 4/2013 |
| KR | 10-2013-0071078 A | 6/2013 |
| KR | 10-1523974 B1 | 5/2015 |
| KR | 10-2015-0062377 A | 6/2015 |
| KR | 10-2016-0011134 A | 1/2016 |
| WO | 2004/070261 A1 | 8/2004 |
| WO | 2016/013782 A1 | 1/2016 |

OTHER PUBLICATIONS

Written Opinion of the International Searching Authority issued in PCT/KR2016/007059 dated Dec. 1, 2016 (4 pages).
Office Action issued in corresponding Chinese Application No. 201680084160.6 dated Nov. 20, 2019, and English translation thereof (11 pages).
Office Action issued in corresponding Japanese Application No. 2019-501884 dated Dec. 24, 2019, and English translation thereof (6 pages).

* cited by examiner

US 10,633,167 B2

1

SAFETY VALVE OF GAS CONTAINER

TECHNICAL FIELD

The present invention relates to a gas cylinder safety valve, and more particularly, to a gas cylinder safety valve capable of blocking a gas flow path in accordance with a temperature and pressure inside a main body, thereby extinguishing fire of a gas stove.

BACKGROUND ART

Generally, examples of a portable gas cylinder include a portable butane gas cylinder which is filled with a butane gas mixture having butane gas as a main ingredient among liquefied petroleum gases and used in a portable gas stove and an aerosol cylinder such as a hair spray, an insecticide spray, and a lacquer spray which uses a liquefied petroleum gas or the like as a propellant. Such portable gas cylinders use a gas pressure in the cylinder to extrude content therein to the outside, and a pressure at a certain level or higher is always acting therein.

When a butane gas cylinder receives high heat from the surroundings in a distribution process or during use, a pressure of liquefied gas inside the butane gas cylinder rises and the butane gas cylinder explodes. Particularly, in the case of a butane gas cylinder used in a portable gas stove, when the butane gas cylinder is atypically used without abiding by safety regulations during use, or a high temperature or a pressure at a certain level or higher is acted on the butane gas cylinder and thus a pressure therein is increased, the cylinder may be deformed or damaged, or in worse cases, may explode.

The related prior art includes Korean Unexamined Utility Model Application Publication No. 2005-0092527 (Sep. 22, 2005, Title of Invention: Portable Gas Cylinder).

DISCLOSURE

Technical Problem

The present invention is directed to providing a gas cylinder safety valve capable of blocking a gas flow path in accordance with a pressure inside a main body, thereby extinguishing fire of a gas stove and preventing a safety accident.

Technical Solution

A gas cylinder safety valve according to the present invention includes a valve part configured to discharge gas filled in a main body and a gas blocking part disposed in the valve part and configured to block a gas flow path in accordance with a pressure inside the main body, wherein the gas blocking part includes a blocking operation part disposed in the valve part, a blocking pin member disposed to be slidable in the blocking operation part and configured to selectively block the gas flow path, and a separation preventing cap coupled to the blocking operation part and configured to prevent separation of the blocking pin member.

A gas introduction path through which gas is introduced and an atmospheric air introduction path through which atmospheric air is introduced may be formed in the blocking operation part, and the blocking pin member may include a sealing film part configured to partition the gas introduction path and the atmospheric air introduction path.

2

An airtightness improving piece which extends toward the gas introduction path and expands outward may be formed at an edge of the sealing film part.

An elastic member configured to elastically support the blocking pin member toward the gas introduction path may be disposed in the blocking operation part.

An extending cover part configured to prevent introduction of gas from the gas flow path toward the blocking operation part may be disposed in the blocking pin member.

Advantageous Effects

When a gas stove is atypically used without abiding by safety regulations such that a pressure inside a main body rises, a gas cylinder safety valve according to the present invention can block a gas flow path in accordance with pressure so that a fire source of the gas stove can be removed, thereby preventing explosion of a gas cylinder.

Further, according to the present invention, a flow path can be blocked without an influence of a governor of the gas stove due to a configuration which operates in accordance with an internal pressure using an atmospheric pressure through an atmospheric air introduction path, thereby improving operational reliability.

MODES OF THE INVENTION

Figure 1:
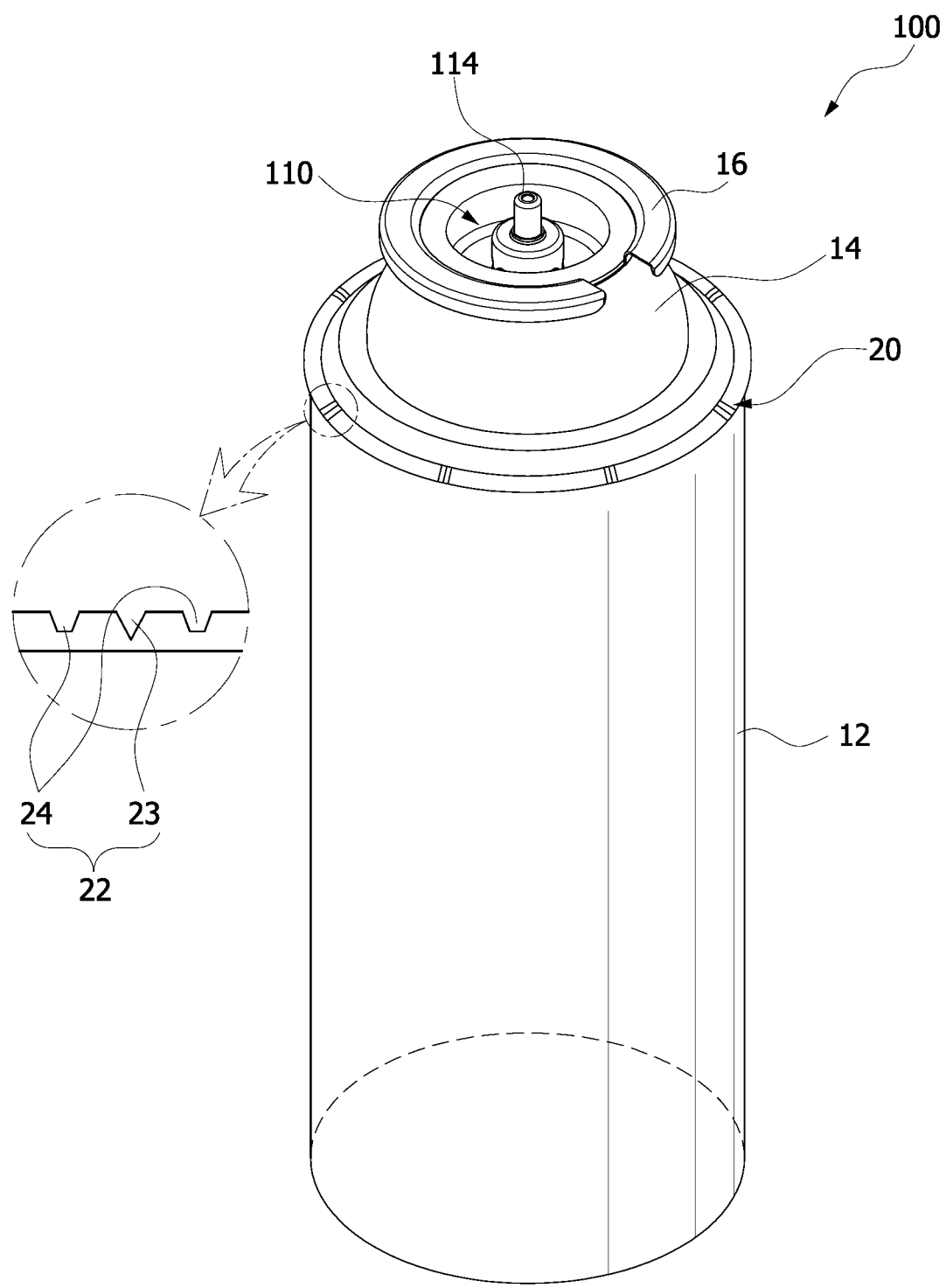
FIG. 1 is a perspective view illustrating a gas cylinder having a gas cylinder safety valve according to an embodiment of the present invention.

Hereinafter, an embodiment of a gas cylinder safety valve according to the present invention will be described with reference to the accompanying drawings.

In this process, the thickness of lines or the size of elements illustrated in the drawings may be exaggerated for clarity and convenience of description. Further, terms which will be described below are those defined in consideration of functions in the present invention and thus may vary according to an intention or practice of a user or an operator. Therefore, such terms should be defined on the basis of contents throughout the present specification.

Figure 2:
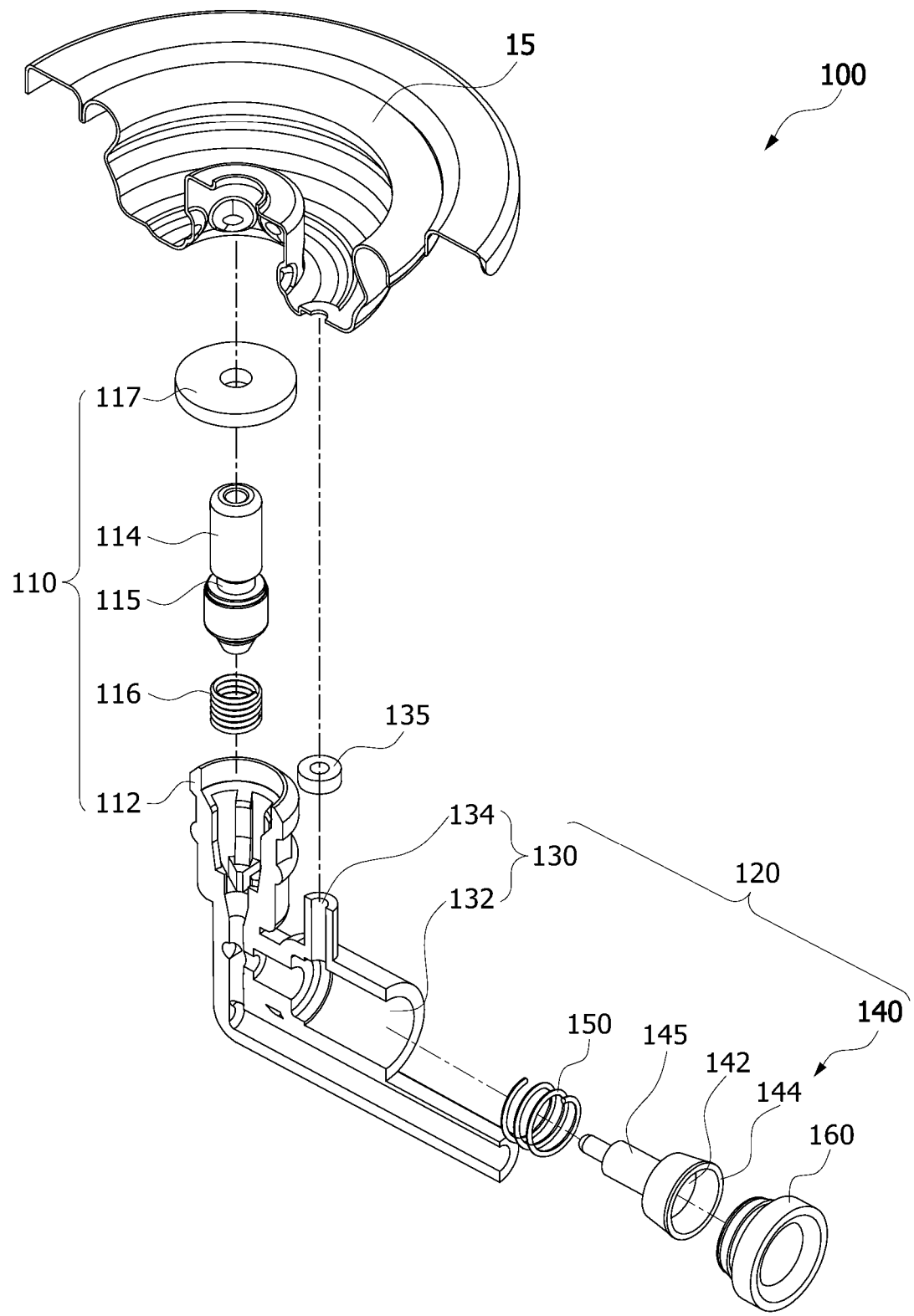
FIG. 2 is an exploded perspective view of the gas cylinder safety valve according to an embodiment of the present invention.
Figure 3:
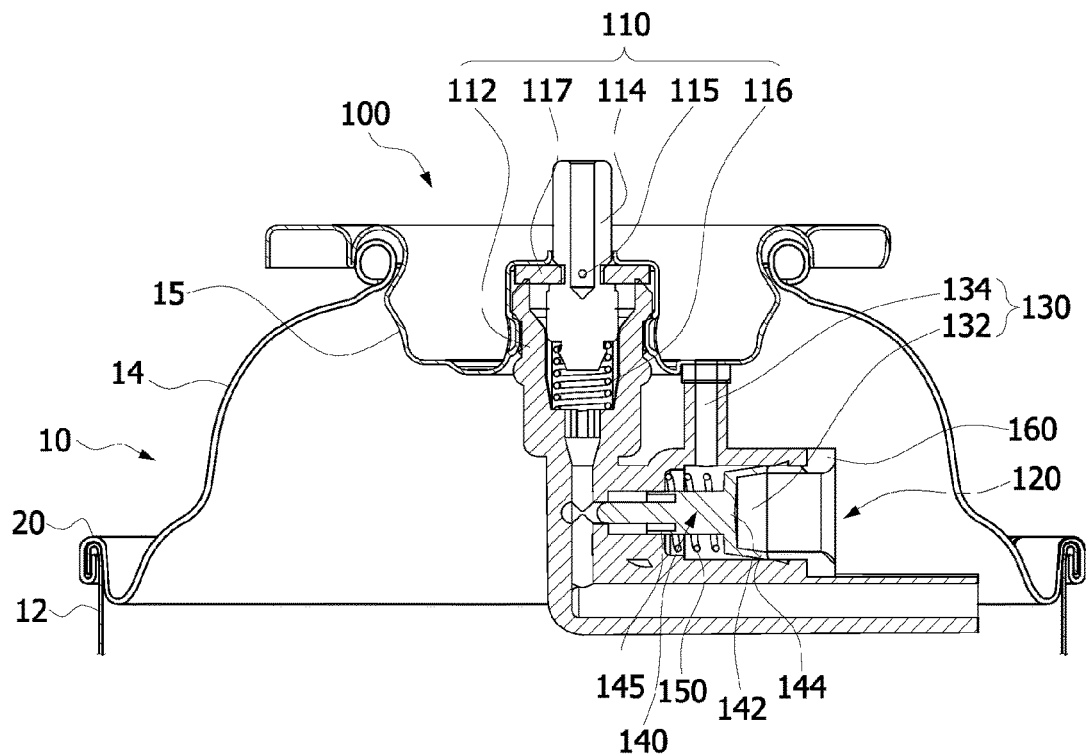
FIG. 3 is a cross-sectional view illustrating the gas cylinder safety valve according to an embodiment of the present invention.
Figure 4:
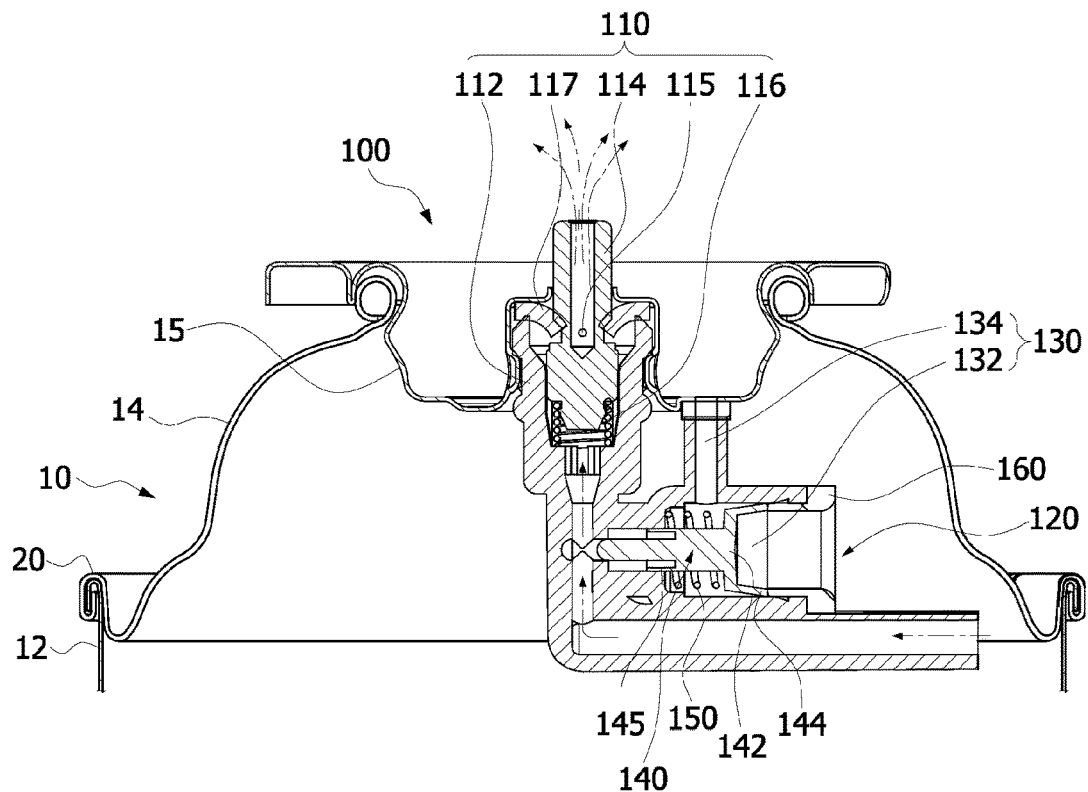
FIG. 4 is a cross-sectional view illustrating a state in which the gas cylinder safety valve according to an embodiment of the present invention is in normal use.
Figure 5:
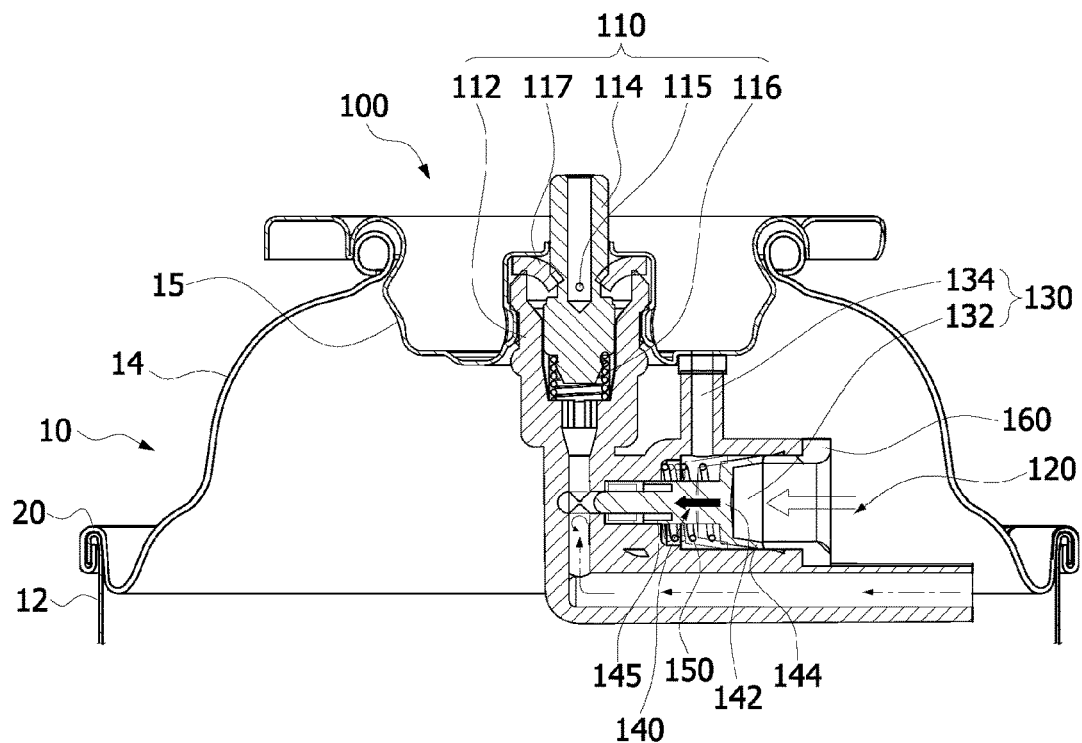
FIG. 5 is an operational view illustrating blocking of a flow path of the gas cylinder safety valve according to an embodiment of the present invention.
Figure 6:
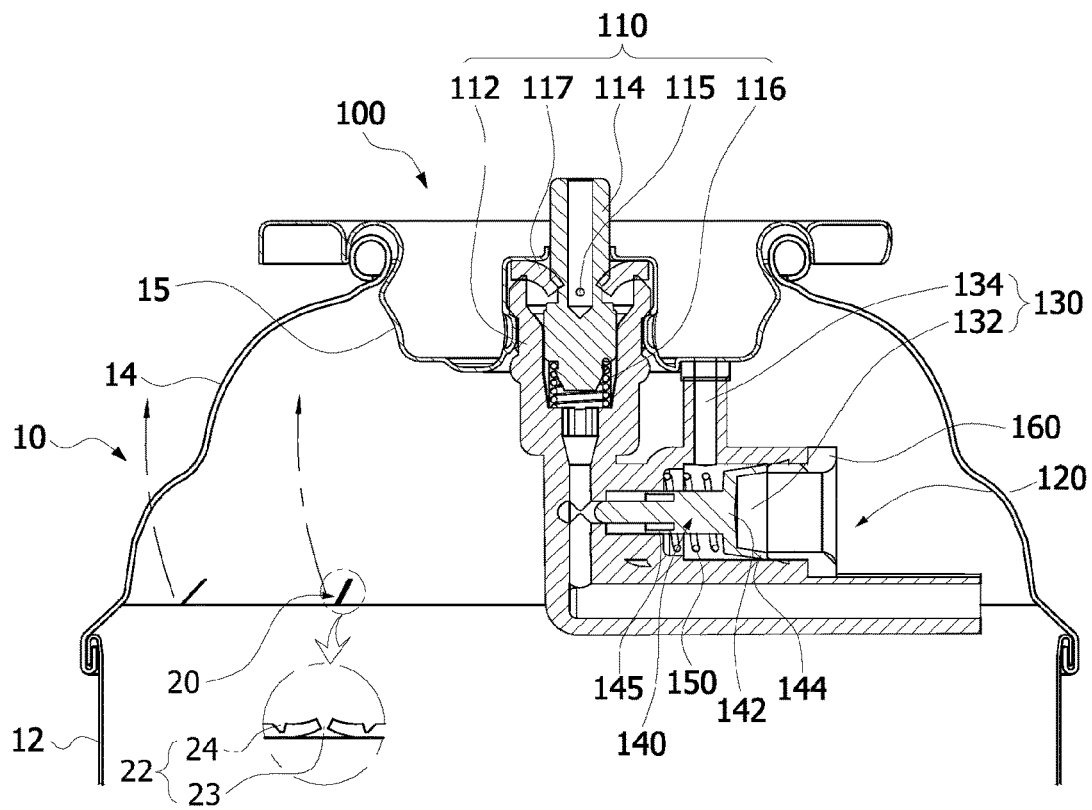
FIG. 6 is an operational view of a gas releasing part of the gas cylinder having the gas cylinder safety valve according to an embodiment of the present invention.

FIG. 1 is a perspective view illustrating a gas cylinder having a gas cylinder safety valve according to an embodiment of the present invention, FIG. 2 is an exploded perspective view of the gas cylinder safety valve according to an embodiment of the present invention, FIG. 3 is a cross-sectional view illustrating the gas cylinder safety valve according to an embodiment of the present invention, FIG. 4 is a cross-sectional view illustrating a state in which the gas cylinder safety valve according to an embodiment of the present invention is in normal use, FIG. 5 is an operational view illustrating blocking of a flow path of the gas cylinder safety valve according to an embodiment of the present invention, and FIG. 6 is an operational view of a gas releasing part of the gas cylinder having the gas cylinder safety valve according to an embodiment of the present invention.

Referring to FIGS. 1 to 6, a gas cylinder safety valve 100 according to an embodiment of the present invention includes a valve part 110 and a gas blocking part 120.

First, a gas cylinder 10 includes a main body 12, a dome 14, and an upper cap 15 and is formed of a metal material having a predetermined thickness or greater so as to have durability. The dome 14 is coupled to an upper portion of the main body 12, the upper cap 15 is coupled to the center of the dome 14, and the gas cylinder safety valve 100 is disposed in the upper cap 15.

The valve part 110 discharges gas fill in the main body 12. The valve part 110 includes a valve housing 112, which is disposed in the upper cap 15 and has a flow path configured to allow communication between an inner portion and an outer portion of the main body 12, and a stem 114 disposed in the valve housing 112 and configured to selectively discharge gas inside the main body 12.

The valve housing 112 is coupled to the upper cap 15, and the stem 114 is disposed at the center of the valve housing 112. The stem 114 is elastically supported by an elastic member 116 in an inner space of the valve housing 112, and an orifice 115 passing through an outer periphery is formed in the stem 114. Further, a stem gasket 117 configured to block the orifice 115 is disposed between the upper cap 15 and the valve housing 112 and blocks the orifice 115 so that gas in the main body 12 is not discharged to the outside. When the stem 114 is pressed due to an external force, the orifice 115 is opened and the gas in the main body 12 is discharged to the outside.

The gas blocking part 120 is disposed in the valve part 110 and is configured to block a gas flow path in accordance with a pressure inside the main body 12. The gas blocking part 120 may block gas discharged to the outside through the stem 114 of the valve housing 112. That is, the gas blocking part 120 serves to remove a fire source by blocking the discharged gas. The gas blocking part 120 includes a blocking operation part 130 disposed in the valve part 110, a blocking pin member 140 disposed to be slidable in the blocking operation part 130 and configured to selectively block the gas flow path, and a separation preventing cap 160 coupled to the blocking operation part 130 and configured to prevent separation of the blocking pin member 140.

The blocking operation part 130 is integrally formed with the valve housing 112. That is, the blocking operation part 130 is integrally injection-molded upon injection of the valve housing 112. Further, a gas introduction path 132 through which gas is introduced and an atmospheric air introduction path 134 through which atmospheric air is introduced are formed in the blocking operation part 130. That is, as illustrated in FIGS. 2 and 3, the valve housing 112 includes a vertical part in which the stem 114 is disposed and a horizontal part which extends after being refracted toward one side from the vertical part, and a blocking space part is formed between inner sides of the vertical part and the horizontal part.

The gas introduction path 132 which is parallel with the horizontal part is formed, and the atmospheric air introduction path 134 which is parallel with the vertical part is formed. The atmospheric air introduction path 134 extends to the upper cap 15, atmospheric air passes therethrough, and an atmospheric air gasket 135 is disposed at an upper end of the atmospheric air introduction path 134.

The blocking pin member 140 includes a sealing film part 142 disposed to be movable in the gas introduction path 132 and configured to partition the gas introduction path 132 and the atmospheric air introduction path 134. The position of the blocking pin member 140 is maintained when an atmospheric pressure and a gas pressure are maintained with respect to the sealing film part 142, and a gas pressure is transmitted through the gas introduction path 132 and the blocking pin member 140 is moved when overpressure occurs in the main body 12 due to atypical use of a gas stove. Due to the movement of the blocking pin member 140, a front end of the blocking pin member 140 may block the gas flow path in the valve housing 112.

An airtightness improving piece 144 which extends toward the gas introduction path 132 and expands outward is formed at an edge of the sealing film part 142. According to such a structure of the airtightness improving piece 144, since the airtightness improving piece 144 may be widened outward upon generation of a pressing force due to gas and may be further adhered to an inner surface of the gas introduction path 132, airtightness may be improved.

An elastic support member 150 configured to elastically support the blocking pin member 140 toward the gas introduction path 132 is disposed in the blocking operation part 130. The elastic support member 150 serves to maintain an atmospheric pressure and maintain a gas pressure to be the same as a gas pressure inside the main body 12 at ordinary times. The elastic support member 150 is contracted upon occurrence of overpressure, and restores the position of the blocking pin member 140 and serves to open the gas flow path in the valve housing 112 upon release of the overpressure.

The blocking pin member 140 includes an extending cover part 145 configured to prevent introduction of gas from the gas flow path toward the blocking operation part 130. As illustrated in FIG. 3, the extending cover part 145 is formed in a tubular shape at a front end part of the blocking pin member 140 and is formed to allow spaces of the gas flow path and the blocking operation part 130 to come into contact with an inner surface of a connection path. In this way, gas guided to the gas flow path may be prevented from being leaked to the outside through the connection path and the atmospheric air introduction path 134.

Actions and effects of the gas cylinder safety valve according to an embodiment of the present invention having the above-described structure will be described below.

When an operating piece of a gas stove is operated after the gas cylinder 10 is mounted in the gas stove, as illustrated in FIG. 4, the stem 114 of the valve part 110 is pressed and gas filled in the main body 12 is discharged to the outside through the stem 114 at the same time. More specifically, as the orifice 115, which was blocked by the stem gasket 117, is opened due to the movement of the stem 114, gas inside the main body 12 is discharged to the outside through the valve housing 112 and is used as a fire source.

In using such a portable gas stove, when the gas stove is atypically used without abiding by safety regulations such that the temperature of the main body 12 rises and overpressure occurs therein, the main body 12 is exposed to danger of explosion. The explosion may be prevented by the gas cylinder safety valve 100.

Initially, as illustrated in FIG. 3, the blocking pin member 140 disposed in the blocking operation part 130 is in a state in which, with respect to the sealing film part 142, one side is supported by an atmospheric pressure and an elastic force of the elastic support member 150 and the other side is supported by a gas pressure inside the main body 12. In such a state, when a temperature inside the main body 12 rises and overpressure occurs inside the main body 12 due to atypically use, as illustrated in FIG. 5, the gas pressure becomes higher than the atmospheric pressure and the elastic force of the elastic support member 150 such that the blocking pin member 140 is moved, thereby blocking the gas flow path by the front end of the blocking pin member 140 passing through the connection path. Consequently, since discharge of gas through the stem 114 may be blocked, fire of the gas stove is extinguished.

In this case, the airtightness improving piece 144 which expands outward may be disposed at the edge of the sealing film part 142 and accurately receive the gas pressure upon movement of the blocking pin member 140 so that a sealing force is improved and operational reliability is improved.

When fire of the gas stove is extinguished as described above, the temperature of the main body 12 drops and the overpressure is released. Then, the blocking pin member 140 is restored to its initial position due to the elastic support member 150 and the atmospheric pressure introduced through the atmospheric air introduction path 134.

In this case, the extending cover part 145 coming into contact with an inner surface of the connection path may be disposed in the blocking pin member 140 and prevent leakage of gas to the outside through the atmospheric air introduction path 134.

Meanwhile, when a secondary temperature rise and overpressure additionally occur due to radiant heat of a cooking appliance, as illustrated in FIG. 6, as the edge of the dome 14 is deformed to be convex due to the overpressure, a gas releasing part 20 formed of pattern groove parts 22 bursts, and overpressure gas is released to the outside. In this way, explosion of the main body 12 may be prevented. Also, since a fire source of the gas stove has already been removed by the gas cylinder safety valve 100, a user may be protected from flames.

The pattern groove parts 22 include a first groove 23 which bursts due to overpressure and second grooves 24 which double the bursting of the first groove 23, thereby allowing a reliable operation. That is, since a higher stress may act toward the first groove 23 and be expanded to a wider range due to the second grooves 24, the bursting is doubled.

Consequently, when the temperature inside the main body 12 rises and overpressure occurs due to an atypical use of the gas cylinder 10, firstly, a fire source of the gas stove may be removed by the gas cylinder safety valve 100, and when a temperature rise and overpressure occur due to radiant heat of the cooking appliance, secondly, the dome 14 may expand and be deformed to be convex and the first groove 23 may burst due to the deformation of the dome 14 such that an accident in which the gas cylinder 10 explodes may be prevented.

As described above, according to the gas cylinder safety valve according to an embodiment of the present invention, when the gas stove is atypically used without abiding by safety regulations such that a pressure inside the main body rises, the gas cylinder safety valve may block the gas flow path in accordance with the pressure so that a fire source of the gas stove may be removed, thereby preventing explosion of the gas cylinder. Also, the flow path may be blocked without an influence of a governor of the gas stove due to a configuration which operates in accordance with an internal pressure using the atmospheric pressure through the atmospheric air introduction path, thereby improving operational reliability.

The present invention has been described above with reference to the embodiments illustrated in the drawings, but the description is merely illustrative, and one of ordinary skill in the art to which the art pertains should understand that various modifications and other equivalent embodiments are possible from the description above.

Therefore, the actual technical scope of the present invention should be defined on the basis of the claims below.

The invention claimed is:

1. A gas cylinder safety valve comprising:
    a gas cylinder including a main body;
    a valve housing including a valve part and an outlet orifice, the valve part configured to selectively discharge gas filled in the main body through the outlet orifice;
    a gas flow path disposed in the valve housing leading from the main body to the outlet orifice;
    a gas blocking part disposed in the valve housing and configured to block the gas flow path upon occurrence of an overpressure inside the main body, wherein the gas blocking part includes:
        a blocking operation part disposed in the valve housing and defining a gas introduction path;
        a blocking pin member disposed to be slidable in the blocking operation part and configured to selectively block the gas flow path; and
        a separation preventing cap coupled to the blocking operation part and configured to prevent separation of the blocking pin member.

2. The gas cylinder safety valve of claim 1, wherein:
    the gas introduction path through which gas is introduced and an atmospheric air introduction path through which atmospheric air is introduced, the atmospheric air introduction path is formed in the blocking operation part; and
    the blocking pin member includes a sealing film part configured to partition the gas introduction path and the atmospheric air introduction path.

3. The gas cylinder safety valve of claim 2, wherein an airtightness improving piece which extends toward the gas introduction path and expands outward is formed at an edge of the sealing film part.

4. The gas cylinder safety valve of claim 2, wherein an elastic member configured to elastically support the blocking pin member toward the gas introduction path is disposed in the blocking operation part, wherein the elastic member is configured to contract upon the occurrence of overpressure in the main body and to restore the position of the blocking pin and open the gas flow path upon release of the overpressure.

5. The gas cylinder safety valve of claim 2, wherein an extending cover part configured to prevent introduction of gas from the gas flow path toward the blocking operation part is disposed in the blocking pin member.

6. A gas cylinder safety valve comprising:
    a gas cylinder including a main body;
    a valve housing including a valve part and an outlet orifice, the valve part configured to selectively discharge gas filled in the main body through the outlet orifice;
    a gas flow path disposed in the valve housing leading from the main body to the outlet orifice;

a gas blocking part disposed in the valve housing and configured to block the gas flow path in accordance with a pressure inside the main body, wherein the gas blocking part is disposed perpendicular to the valve part and includes:
- a blocking operation part disposed in the valve housing and defining a gas introduction path;
- a blocking pin member disposed to be slidable in the blocking operation part and configured to selectively block the gas flow path; and
- a separation preventing cap coupled to the blocking operation part and configured to prevent separation of the blocking pin member.

7. The gas cylinder safety valve of claim 6, wherein:
the gas introduction path through which gas is introduced and an atmospheric air introduction path through which atmospheric air is introduced, the atmospheric air introduction path is formed in the blocking operation part; and
the blocking pin member includes a sealing film part configured to partition the gas introduction path and the atmospheric air introduction path.

8. The gas cylinder safety valve of claim 7, wherein an airtightness improving piece which extends toward the gas introduction path and expands outward is formed at an edge of the sealing film part.

9. The gas cylinder safety valve of claim 7, wherein an elastic member configured to elastically support the blocking pin member toward the gas introduction path is disposed in the blocking operation part, wherein the elastic member is configured to contract upon an occurrence of overpressure in the main body and to restore the position of the blocking pin and open the gas flow path upon release of the overpressure.

10. The gas cylinder safety valve of claim 7, wherein an extending cover part configured to prevent introduction of gas from the gas flow path toward the blocking operation part is disposed in the blocking pin member.

11. A gas cylinder safety valve comprising:
a gas cylinder including a main body;
a valve housing including a valve part and an outlet orifice, the valve part configured to selectively discharge gas filled in the main body through the outlet orifice;
a gas flow path disposed in the valve housing leading from the main body to the outlet orifice;
a gas blocking part disposed in the valve housing and configured to block the gas flow path in accordance with a pressure inside the main body, wherein the gas blocking part includes:
- a blocking operation part disposed in the valve housing and defining a gas introduction path;
- a blocking pin member disposed to be slidable in the blocking operation part and configured to selectively block the gas flow path;
- a separation preventing cap coupled to the blocking operation part and configured to prevent separation of the blocking pin member; and
- an elastic member configured to elastically support the blocking pin member toward the gas introduction path, wherein the elastic member is configured to contract upon an occurrence of overpressure in the main body and to restore the position of the blocking pin and open the gas flow path upon release of the overpressure.

12. The gas cylinder safety valve of claim 11, wherein:
the gas introduction path through which gas is introduced and an atmospheric air introduction path through which atmospheric air is introduced, the atmospheric air introduction path is formed in the blocking operation part; and
the blocking pin member includes a sealing film part configured to partition the gas introduction path and the atmospheric air introduction path.

13. The gas cylinder safety valve of claim 12, wherein an airtightness improving piece which extends toward the gas introduction path and expands outward is formed at an edge of the sealing film part.

14. The gas cylinder safety valve of claim 12, wherein an extending cover part configured to prevent introduction of gas from the gas flow path toward the blocking operation part is disposed in the blocking pin member.

* * * * *